United States Patent
Chalenko et al.

(10) Patent No.: US 10,712,635 B2
(45) Date of Patent: Jul. 14, 2020

(54) INTERCHANGEABLE LENS MOUNT INSERT

(71) Applicant: Beastgrip, Co, Des Plaines, IL (US)

(72) Inventors: Vadym Chalenko, Northfield, IL (US); Oleksandr O Chop, Des Plaines, IL (US)

(73) Assignee: Beastgrip, Co, Des Plaines, IL (US)

( * ) Notice: Subject to any disclaimer, the term of this patent is extended or adjusted under 35 U.S.C. 154(b) by 188 days.

(21) Appl. No.: 15/785,140

(22) Filed: Oct. 16, 2017

(65) Prior Publication Data
US 2018/0107093 A1    Apr. 19, 2018

Related U.S. Application Data

(60) Provisional application No. 62/408,572, filed on Oct. 14, 2016.

(51) Int. Cl.
*G03B 11/04* (2006.01)
*G02B 7/14* (2006.01)
*G03B 17/56* (2006.01)
*G02B 5/00* (2006.01)

(52) U.S. Cl.
CPC ............ *G03B 11/045* (2013.01); *G02B 5/005* (2013.01); *G02B 7/14* (2013.01); *G03B 17/565* (2013.01)

(58) Field of Classification Search
CPC .... G02B 23/16; G02B 27/0081; G02B 5/005; G03B 1/00; G03B 1/04; G03B 1/041; G03B 1/045; G03B 1/06
USPC .......................................................... 359/611
See application file for complete search history.

(56) References Cited

U.S. PATENT DOCUMENTS

2018/0059355 A1*   3/2018   Schorman .............. G02B 7/006

* cited by examiner

*Primary Examiner* — Robert E. Tallman

(57) ABSTRACT

An interchangeable lens mount insert for lens adapters is positioned into a lens mount to prevent unwanted light from entering a camera lens and to allow for the attachment of nonstandard external lenses to the lens adapter. The interchangeable lens mount insert includes an aperture shroud, an aperture hole, a lens attachment mechanism, and a mount attachment mechanism. The aperture shroud obstructs the camera lens from unwanted light and debris, while the mount attachment mechanism provides a means for securing the aperture shroud to the lens mount. The aperture hole traverses the aperture shroud and allows a select amount of light to reach the camera lens. Meanwhile, the lens attachment mechanism provides a means for securing external lenses to the aperture shroud.

12 Claims, 16 Drawing Sheets

SECTION E-E

INTERCHANGEABLE LENS MOUNT INSERT

The current application claims a priority to the U.S. Provisional Patent application Ser. No. 62/408,572 filed on Oct. 14, 2016.

FIELD OF THE INVENTION

The present invention relates generally to aperture control devices for cameras. More specifically, the present invention is a removable insert that is placed into a lens adapter device to prevent unwanted light from entering the camera lens and allow for the attachment of nonstandard external lenses.

BACKGROUND OF THE INVENTION

Smartphones have democratized the portable digital camera. Because almost every phone is equipped with a serviceable camera, it is easy for the majority of people to take photos of exciting or memorable events. While these cameras are readily available, they are generally incapable of capturing images that compare to those captured by dedicated cameras. One major difference between smartphone cameras and dedicated cameras is the lens. Dedicated cameras have larger lenses that enable a photographer to capture more light, increase the optical zoom, and modify the aperture size. These additional functionalities enable dedicated cameras to surpass the image capturing capabilities of a smartphone. To address this shortcoming, lens adapters have been developed for smartphones. These adapters enable a photographer to attach external lenses to a traditional smartphone.

Therefore it is an object of the present invention to provide a removable insert that can be placed into a lens adapter device to prevent unwanted light from entering the camera lens and allow for the attachment of nonstandard external lenses. In particular, the interchangeable lens mount insert increases the effectiveness and versatility of smartphone lens adapters. The present invention is an insert that fits into the lens mount of a smartphone lens adapter, or other lens adapter, and prevents unwanted light or debris from marring the picture captured by an attached smartphone's camera. Additionally, the present invention enables a photographer to attach nonstandard lenses to the standard lens mount of a smartphone lens adapter.

DETAIL DESCRIPTIONS OF THE INVENTION

All illustrations of the drawings are for the purpose of describing selected versions of the present invention and are not intended to limit the scope of the present invention.

The present invention is an interchangeable lens mount insert that fits into the lens mount of a smartphone lens adapter, or other lens adapter device. It is an aim of the present invention to provide a device that facilitates picture taking and protects the camera lens by preventing unwanted light or dust from entering the camera of an attached smartphone. Furthermore, it is an aim of the present invention to provide an intermediary device between the camera module of a smartphone and an external lens, wherein the present invention supports the external lens. More specifically, the present invention is designed with an attachment mechanism that enables non-standard lenses to be attached to the smartphone lens adapter and used in conjunction with the camera module.

Figure 1:
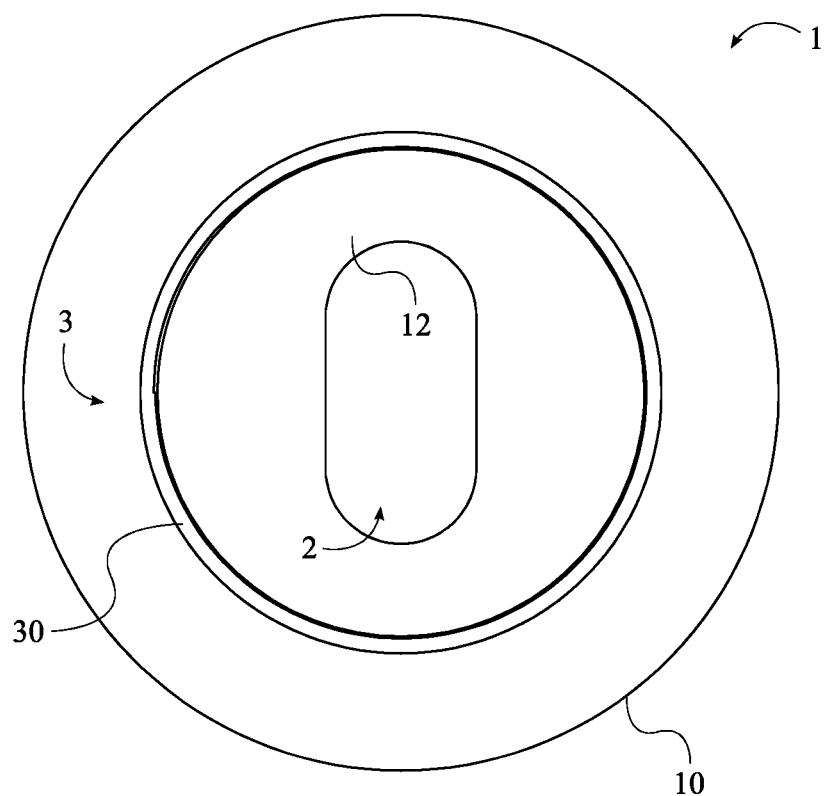
FIG. 1 is a front view of the present invention, wherein the lens attachment mechanism is positioned about the aperture hole.

In reference to FIG. 1, the interchangeable lens mount insert comprises an aperture shroud 1, an aperture hole 2, and a mount attachment mechanism. The aperture shroud 1 provides the main body of the present invention, while the aperture hole 2 dictates the amount of light that is able to pass through the aperture shroud 1 and reach the camera module. The mount attachment mechanism provides a means for securing the present invention to the lens adapter. In some embodiments, the present invention may further comprise a lens attachment mechanism 3, wherein the lens attachment mechanism 3 provides a means for attaching an external lens to the present invention.

Figure 2:
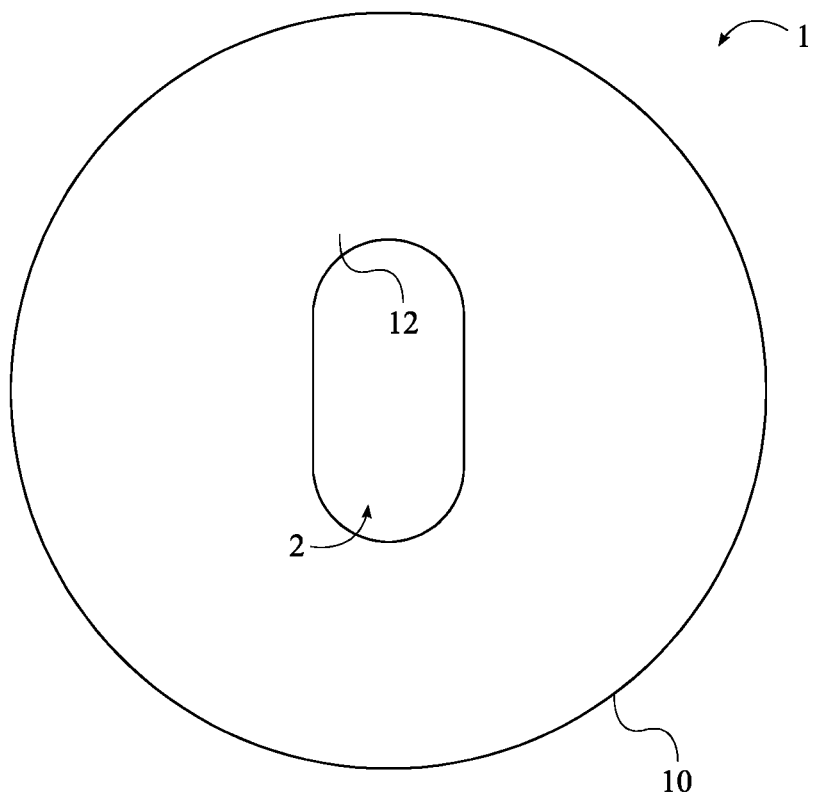
FIG. 2 is a rear view of the present invention, wherein the aperture hole is concentric with the aperture shroud.

The aperture shroud 1 is a piece of material that is shaped to tightly fit into the lens mount portion of the lens adapter in order to obstruct the camera lens from light, dust, debris, etc. As such, the aperture shroud 1 is generally disc shaped, as shown in FIG. 1-2, to conform to the general circular shape of the lens mount portion of lens adapters. However, it is possible for the aperture shroud 1 to be any other shape in order to match the profile of a desired lens mount. In the preferred embodiment of the present invention, the aperture shroud 1 is flexible, wherein the aperture shroud 1 can bend and conform to the shape and size of the lens mount. This allows the aperture shroud 1 to be used with multiple lens mounts of different sizes. In other embodiments of the present invention, the aperture shroud 1 may be a rigid disk, wherein the aperture shroud 1 fits lens mounts of one particular size.

In reference to FIG. 1 and FIG. 12-14, the aperture shroud 1 comprises a lateral shroud wall 10 and a cover panel 12, wherein the lateral shroud wall 10 is perimetrically connected to the cover panel 12. As such the lateral shroud wall 10 forms the outer perimeter of the aperture shroud 1 that aligns with the lens mount opening. The lateral shroud wall 10 is configured to minimize the gap between the lens mount and the aperture shroud 1, thus minimizing light leaks into the camera lens. Furthermore, the lateral shroud wall 10 provides a body of material about which the mount attachment mechanism is integrated with the aperture shroud 1.

Figure 3:
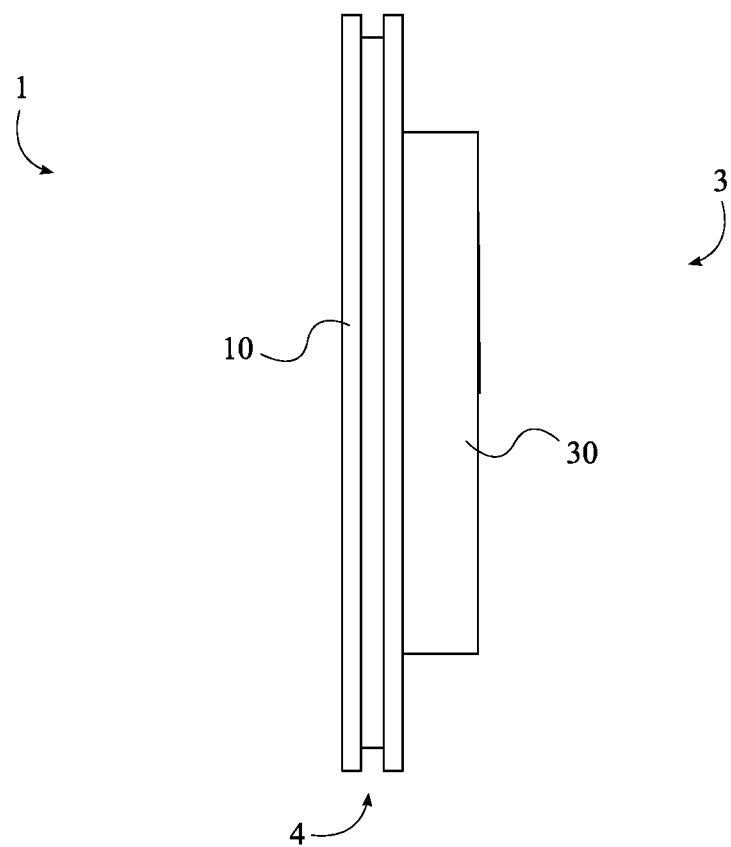
FIG. 3 is a left side view of the present invention, wherein the mount attachment mechanism is a shroud channel.
Figure 12:
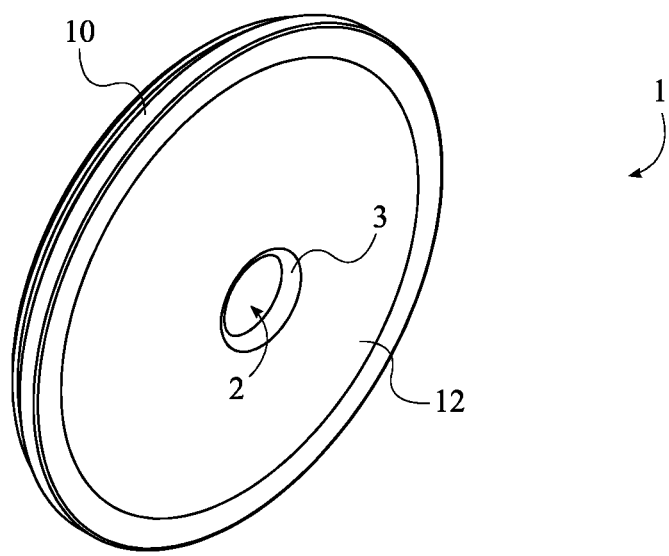
FIG. 12 is a perspective view of the present invention, wherein the cover panel is convex and the mount attachment mechanism is a ridge.
Figure 13:
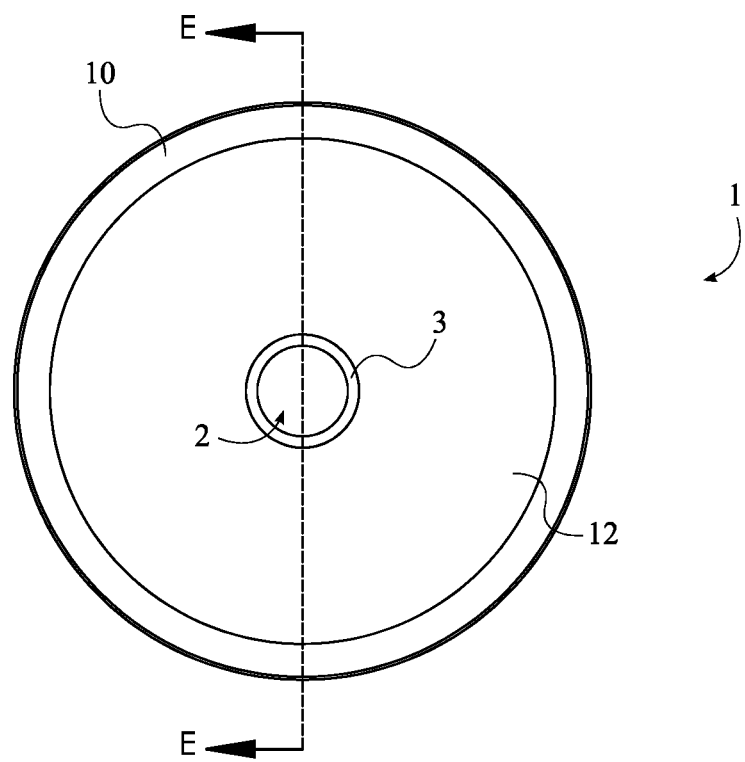
FIG. 13 is a front view of the present invention, wherein the cover panel is convex and the mount attachment mechanism is a ridge.
Figure 14:
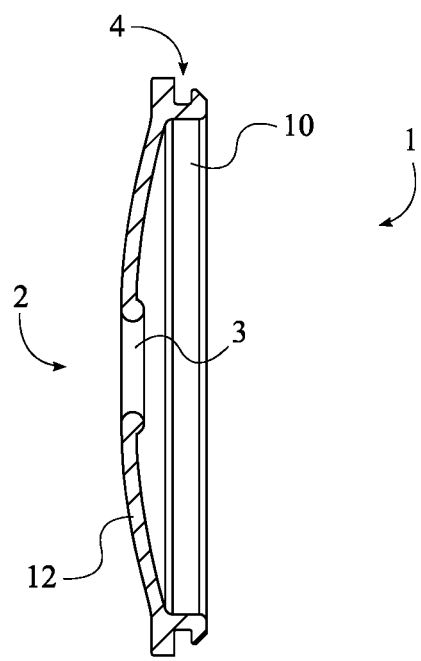
FIG. 14 is a sectional view of the present invention taken along line E-E of FIG. 13.
Figure 15:
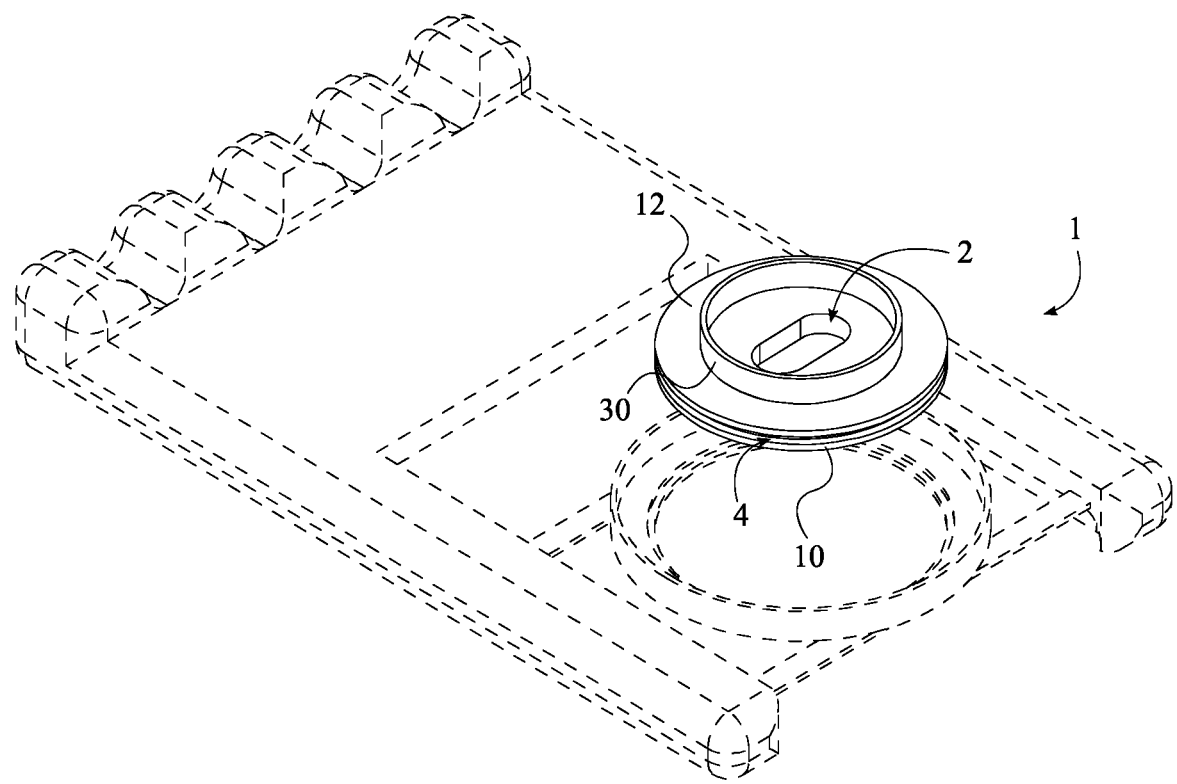
FIG. 15 is a perspective view of the present invention being aligned with the lens mount of a lens adapter.

Meanwhile, the cover panel 12 provides an opaque surface that obstructs light and debris from entering the lens mount. Furthermore, the cover panel 12 protects other phone or camera features that may be positioned adjacent to the camera lens, such as a microphone or flash module. In the preferred embodiment of the present invention, the cover panel 12 is a flat piece of material, as shown in FIG. 1-3; however, in other embodiments of the present invention, the cover panel 12 may be concave or convex, as shown in FIG. 12-14. In addition to the obstructing light and debris, the cover wall provides a body of material about which the lens attachment mechanism 3 is integrated for mounting external lens.

Figure 5:
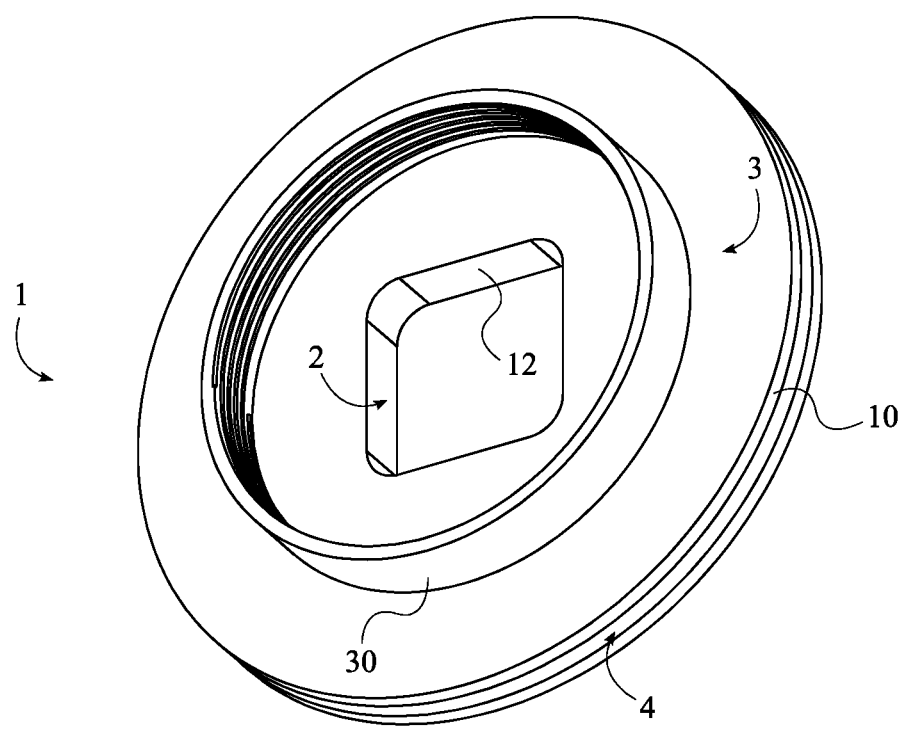
FIG. 5 is perspective view of the present invention, wherein the aperture hole is an alternate shape.
Figure 6:
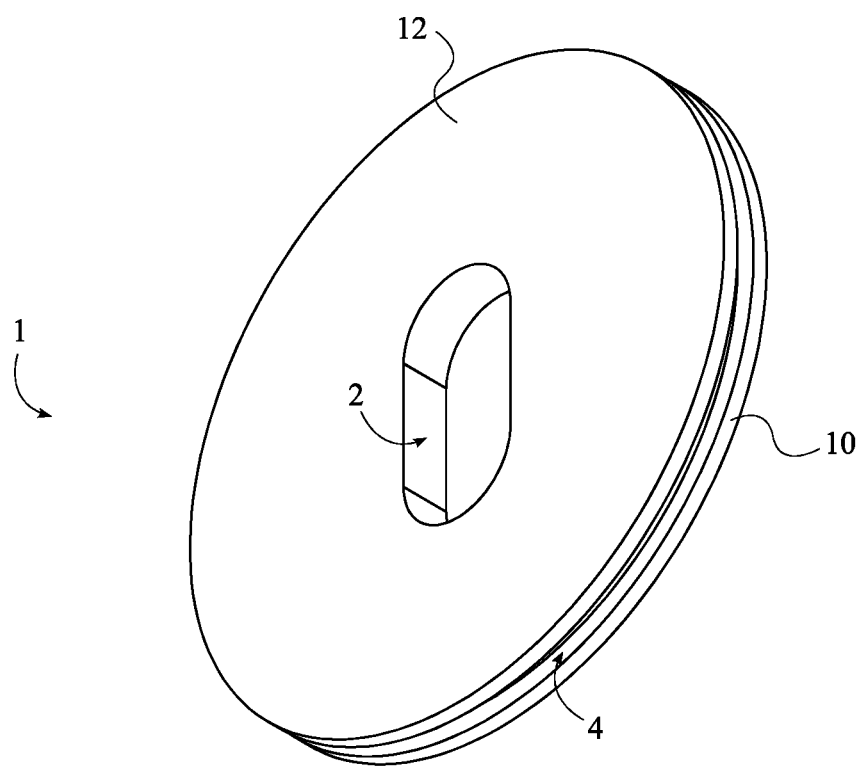
FIG. 6 is a perspective view of the present invention, wherein the aperture hole is ovular.
Figure 7:
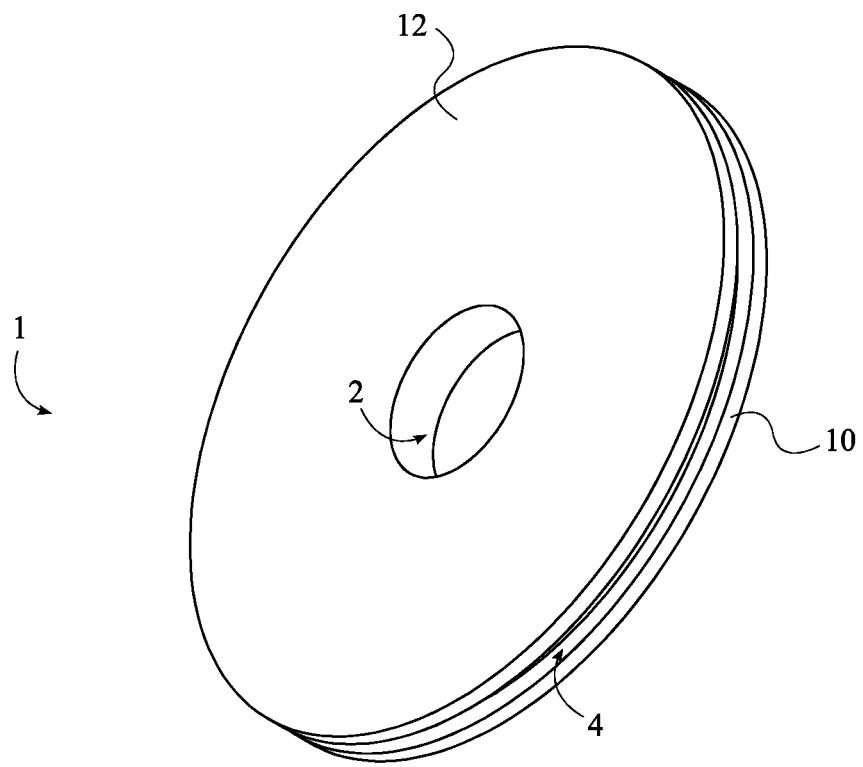
FIG. 7 is a perspective view of the present invention, wherein the aperture hole is circular.

The aperture hole 2 traverses through the aperture shroud 1; more specifically, through the cover wall. The aperture hole 2 allows a select amount of light to pass through the aperture shroud 1 and reach the camera lens. Thus, the aperture hole 2 functions as the transmission window through which light is able to pass into the camera of the attached smartphone. The aperture hole 2 can be designed in various shapes and sizes, as depicted through FIG. 5-7, which may correspond to the various camera modules used in a variety of smartphones. Alternatively, the aperture hole 2 may be designed to mismatch the camera module, thus altering the viewing window of the camera lens.

The present invention is designed to be quickly removed and installed as needed. Thus, the mount attachment mechanism provides a temporary, yet secure, means of attaching the present invention to the lens mount of the lens adapter. The mount attachment mechanism may provide a mechanical, magnetic, frictional, or other suitable means for fastening the aperture shroud 1 to the lens mount. In some embodiments of the present invention, the mount attachment mechanism is laterally integrated with the lateral shroud wall 10. In other embodiments of the present invention, the mount attachment mechanism is a separate body from the aperture shroud 1, wherein the mount attachment mechanism perimetrically interfaces with the aperture shroud 1.

Figure 4:
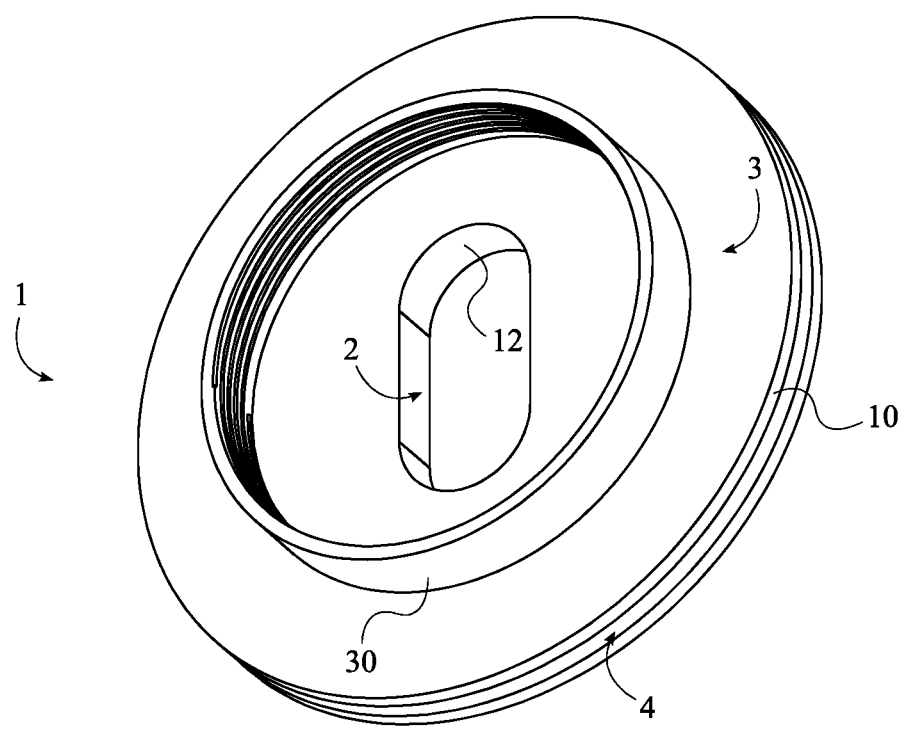
FIG. 4 is a perspective view of the present invention, showing the lateral attachment wall being threaded.

In the preferred embodiment of the present invention, the mount attachment mechanism is a shroud channel 4, as depicted in either FIG. 3-4 or FIG. 14. The shroud channel 4 laterally traverses into the lateral shroud wall 10 opposite the cover panel 12, and traverses about the entirety of the aperture shroud 1. In such an embodiment, the aperture shroud 1 is pressed into the lens mount, wherein the shroud channel 4 allows the lateral shroud wall 10 to interface with a flange of the lens mount. The flange is snapped or otherwise positioned into the shroud channel 4, wherein the lateral shroud wall 10 becomes interlocked with the flange, securing the aperture shroud 1 within the lens mount.

Figure 8:
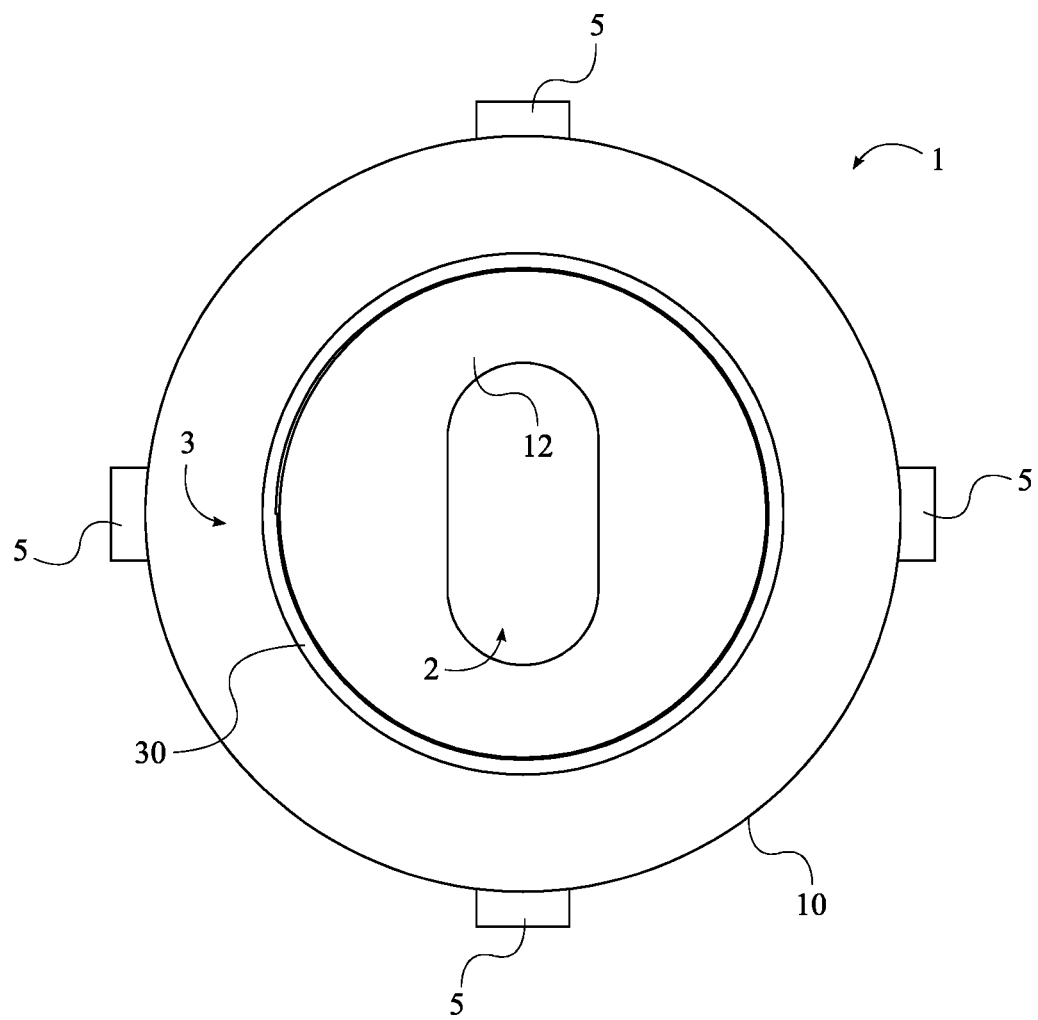
FIG. 8 is a front view of the present invention, wherein the mount attachment mechanism is one or more shroud flanges.

In reference to FIG. 8, in other embodiments of the present invention, the mount attachment mechanism is a one or more shroud flanges 5. The one or more shroud flanges 5 is adjacently connected to the lateral shroud wall 10, opposite the cover panel 12, such that each of the one or more shroud flanges 5 is radially disposed about the aperture shroud 1. Correspondingly, the lens mount includes one or more twist lock grooves into which the one or more shroud flanges 5 is slotted. Each of the one or more shroud flanges 5 is aligned with one of the twist lock grooves, wherein the aperture shroud 1 is then pressed into the lens mount. Once pressed into the lens mount, the aperture shroud 1 is rotated, wherein each of the one or more shroud flanges 5 traverses along the corresponding twist lock groove to secure the aperture shroud 1 in place within the lens mount.

Figure 9:
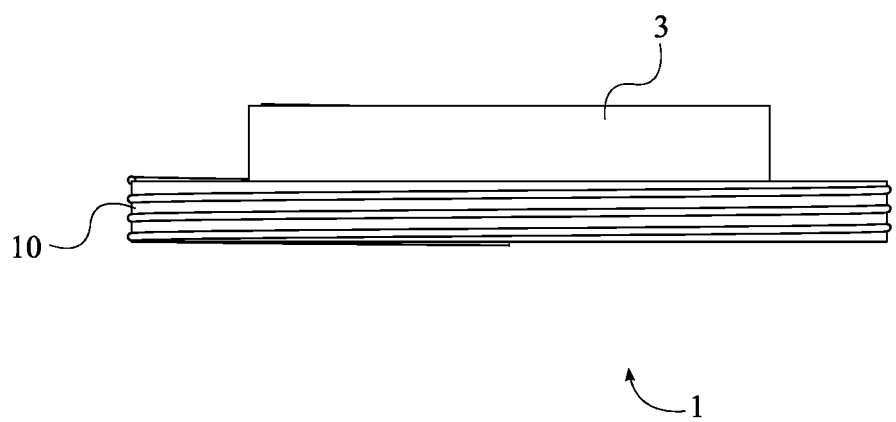
FIG. 9 is a bottom view of the present invention, wherein the lateral shroud wall is threaded to form the mount attachment mechanism.

In reference to FIG. 9, in some embodiments of the present invention, the lateral shroud wall 10 is threaded, wherein the threading forms the mount attachment mechanism. The threading of the lateral shroud wall 10 corresponds to the threading of the desired lens mount with which the aperture shroud 1 is designed to interface. To secure the aperture shroud 1 within the lens mount, the aperture shroud 1 is simply placed over the lens mount opening and rotated into place.

In some embodiments, the mount attachment mechanism may simply be a surface with a high coefficient of friction, wherein the aperture is pressed into place within the lens mount and the mount attachment mechanism prevents the aperture shroud 1 from slipping or sliding out of the lens mount. This is particularly useful in embodiments where the aperture shroud 1 is flexible, wherein the aperture shroud 1 can be flexed, bent, or otherwise compressed inwards and positioned within the lens mount. Once positioned within the lens mount, the aperture shroud 1 then flexes outwards, applying pressure to the lens mount. This applied pressure and the high coefficient of friction of the mount attachment mechanism then acts to hold the aperture shroud 1 in place within the lens mount.

In other embodiments, the mount attachment mechanism may be a textured surface that provides grip between the aperture shroud 1 and the lens mount. The mount attachment mechanism being a textured surface is particularly useful in embodiments where the aperture shroud 1 is flexible, wherein the applied outward pressure of the aperture shroud 1 and the textured surface hold the aperture shroud 1 in place within the lens mount. The textured surface may also be used in conjunction with a material having a high coefficient of friction to further secure the aperture shroud 1 within the lens mount.

Figure 10:
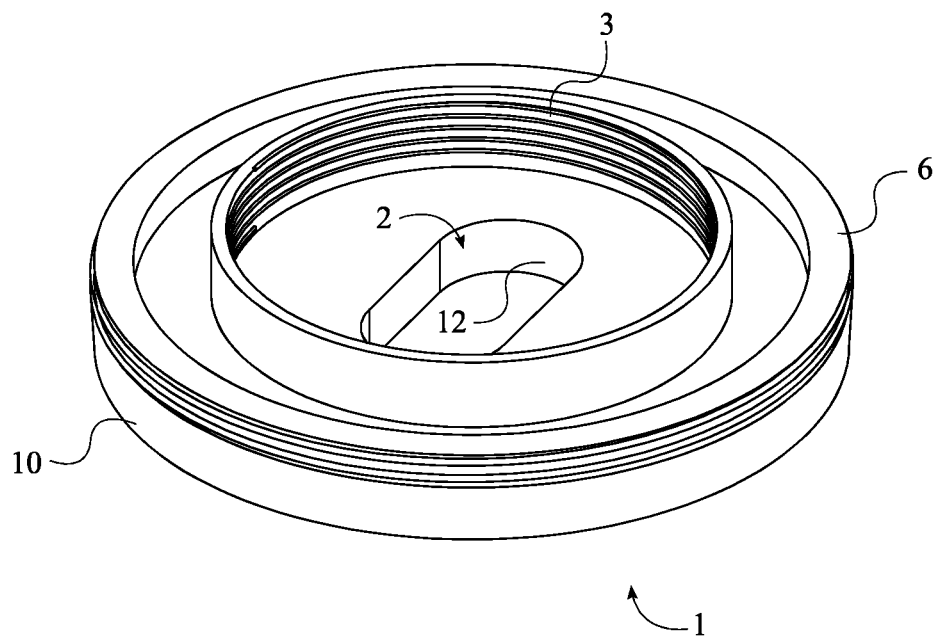
FIG. 10 is a perspective view of the present invention, wherein the mount attachment mechanism is a retention ring that is medially interfaces with the aperture shroud.
Figure 11:
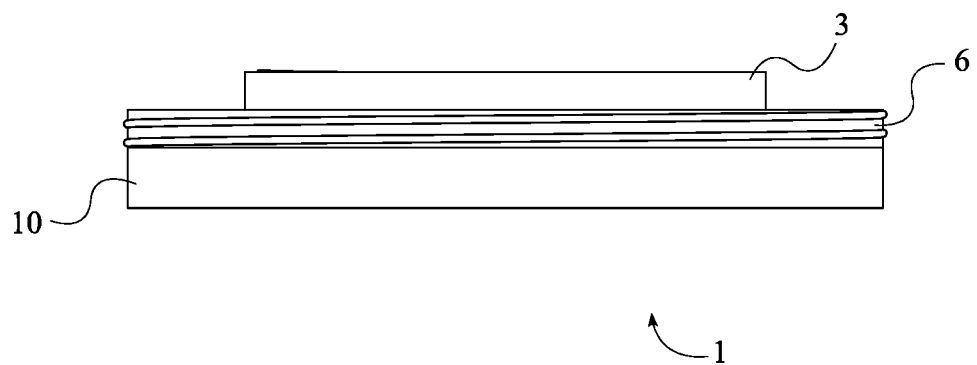
FIG. 11 is a bottom view of the present invention showing the retention ring being positioned flush with the aperture shroud.
Figure 16:
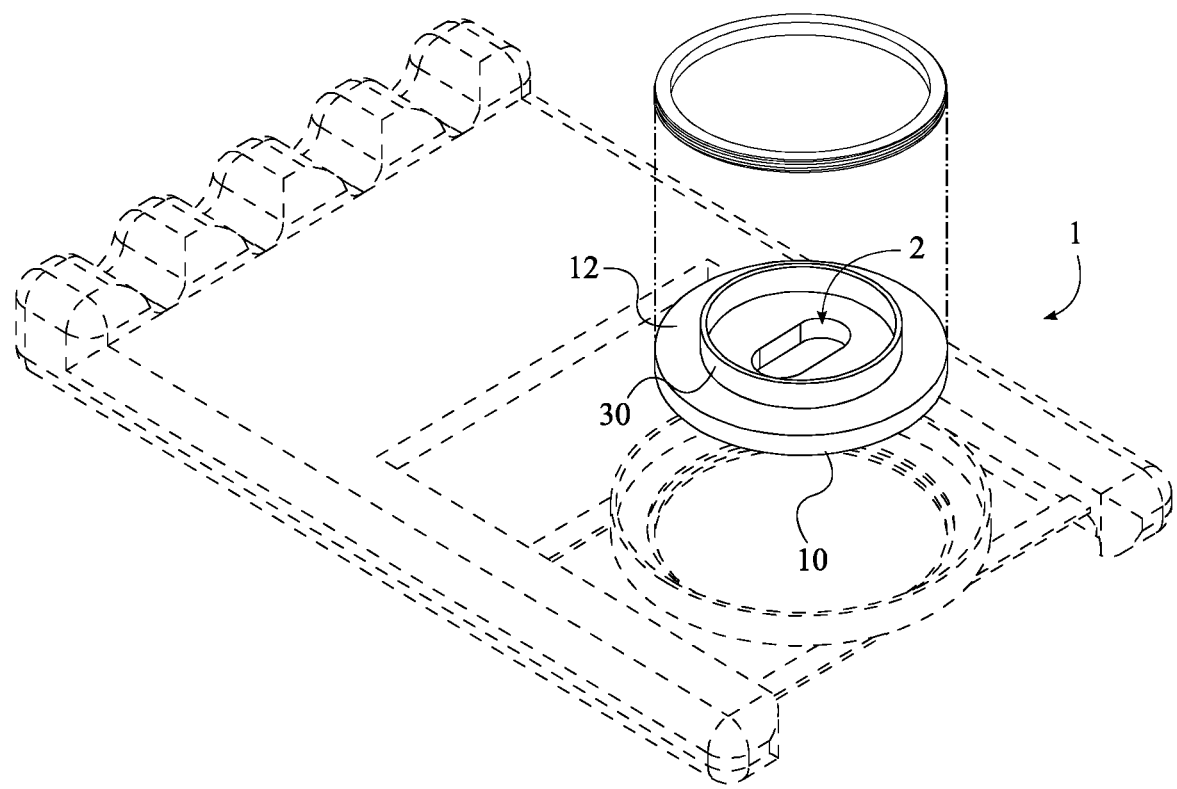
FIG. 16 is a perspective view of the retention ring and the aperture shroud being aligned with the lens mount of a lens adapter.

In reference to FIG. 10-11 and FIG. 16, in some embodiments of the present invention, the mount attachment mechanism is a retention ring 6, wherein the mount attachment mechanism is a separate body from the aperture shroud 1. The retention ring 6 is threaded, wherein the threading of the retention ring 6 corresponds to the threading of the desired lens mount with which the aperture shroud 1 is designed to interface. The aperture shroud 1 is first placed into the lens mount, wherein the aperture shroud 1 rests on a flange of the lens mount. The retention ring 6 is then positioned over top of the aperture shroud 1 and rotated into place, wherein the retention ring 6 medially interfaces with the aperture shroud 1 and is pressed flush against the aperture shroud 1 to clamp the aperture shroud 1 in place within the lens mount.

The lens attachment mechanism 3 is integrated with the aperture shroud 1 and provides a means for attaching an external lens to the aperture shroud 1. More specifically, the lens attachment mechanism 3 is adjacently connected to the aperture shroud 1 and is positioned about the aperture hole 2. The lens attachment mechanism 3 is used to supplement the lens mount of a smartphone lens adapter. That is, by inserting the present invention into the lens mount of a smartphone lens adapter, a user is able to broaden the range of possible lenses that can be affixed to the lens adapter and used with the smartphone camera. The lens attachment mechanism 3 is connected to the aperture shroud 1, such that an attached external lens is maintained in optical communication with the camera of the smartphone attached to the lens adapter.

The lens attachment mechanism 3 can provide a mechanical, magnetic, frictional, or other suitable means for fastening an external lens to the aperture shroud 1. In reference to FIG. 4-5, in one embodiment, the lens attachment mechanism 3 comprises a lateral attachment wall 30 that is adjacently connected to the aperture shroud 1 and encircles the aperture hole 2. The lateral attachment wall 30 extends away from the aperture shroud 1 and is threaded, wherein external lenses having corresponding threading may be attached to the aperture shroud 1 via the lens attachment mechanism 3. The lateral attachment wall 30 may have male or female threads, and the threads may be positioned on either side of the lateral attachment wall 30.

In other embodiments of the present invention, the lens attachment mechanism 3 is one or more magnets positioned about the aperture hole 2. External lenses having corresponding magnets may then be secured to the aperture shroud 1. In yet other embodiments of the present invention, the lens attachment mechanism 3 is one or more clamps, or one or more latches. The desired external lens is positioned onto the aperture shroud 1, wherein the one or more clamps, or the one or more latches interfaces with a portion of the external lens in order to secure the external lens to the aperture shroud 1. Other types of snap lock, or twist lock mechanisms may also be used to secure an external lens to the aperture shroud 1.

In reference to FIG. 12-14, in some embodiments of the present invention, the lens attachment mechanism 3 is a ridge that traverses around the aperture hole 2. The ridge is oriented towards the camera lens when the aperture shroud 1 is positioned into the lens mount. A portion of the external lens is positioned through the aperture hole 2, wherein the ridge interfaces with the external lens and prevents the external lens from slipping out of the aperture hole 2.

Although the invention has been explained in relation to its preferred embodiment, it is to be understood that many other possible modifications and variations can be made without departing from the spirit and scope of the invention as hereinafter claimed.

What is claimed is:

1. An interchangeable lens mount insert comprising:
   an aperture shroud;
   a single shroud channel;
   the aperture shroud comprising an aperture hole, a lateral shroud wall and a cover panel;
   the lateral shroud wall being perimetrically connected to the cover panel;
   the aperture hole traversing through the cover panel;
   the aperture hole being concentric with the cover panel;
   the single shroud channel laterally traversing into and surrounding the lateral shroud wall; and
   the single shroud channel being oppositely positioned to the cover panel.

2. The interchangeable lens mount insert as claimed in claim 1 comprising:
   the aperture shroud being disc shaped.

3. The interchangeable lens mount insert as claimed in claim 1 comprising:
   the aperture shroud being flexible.

4. The interchangeable lens mount insert as claimed in claim 1 comprising:
   a lens attachment mechanism;
   the lens attachment mechanism being connected to the cover panel; and
   the lens attachment mechanism being positioned about the aperture hole.

5. The interchangeable lens mount insert as claimed in claim 4 comprising:
   the lens attachment mechanism comprising a lateral attachment wall;
   the lateral attachment wall encircling the aperture hole; and
   the lateral attachment wall being threaded.

6. The interchangeable lens mount insert as claimed in claim 4, wherein the lens attachment mechanism is a ridge.

7. The interchangeable lens mount insert as claimed in claim 4, wherein the lens attachment mechanism is one or more magnets.

8. The interchangeable lens mount insert as claimed in claim 4, wherein the lens attachment mechanism is one or more clamps.

9. The interchangeable lens mount insert as claimed in claim 4, wherein the lens attachment mechanism is one or more latches.

10. The interchangeable lens mount insert as claimed in claim 1 comprising:
    one or more shroud flanges;
    the one or more shroud flanges being connected to the lateral shroud wall;
    the one or more shroud flanges being oppositely positioned to the cover panel; and
    the one or more shroud flanges being radially disposed about the lateral shroud wall.

11. The interchangeable lens mount insert as claimed in claim 1 comprising:
    the lateral shroud wall being threaded.

12. The interchangeable lens mount insert as claimed in claim 1 comprising:
    a retention ring;
    the retention ring being positioned on the cover panel;
    the retention ring being pressed flush against the cover panel; and
    the retention ring being threaded.

\* \* \* \* \*